Figure 1:
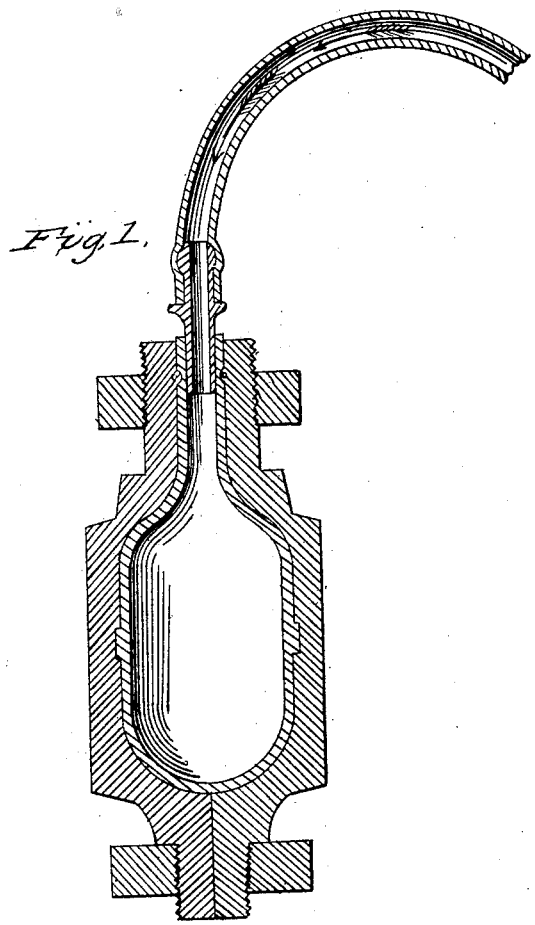
Figure 2:
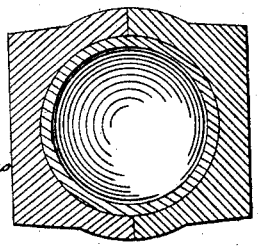

D. D. PARMELEE.

Vulcanizing Apparatus.

No. 26,861.

Patented Jan'y 17, 1860.

Witnesses:
N. Fairfax
Jeremiah Dickens

Inventor:
D. D. Parmelee by
A. P. Thorton atty

UNITED STATES PATENT OFFICE.

DUBOIS D. PARMELEE, OF SALEM, MASSACHUSETTS, ASSIGNOR TO JOHN A. GREENE.

MANUFACTURE OF ELASTIC HOLLOW MOLDED ARTICLES.

Specification of Letters Patent No. 26,861, dated January 17, 1860.

*To all whom it may concern:*

Be it known that I, DUBOIS D. PARMELEE, of Salem, in the county of Essex and State of Massachusetts, have discovered a new and useful Method of Manufacturing Hollow Molded Articles from India-Rubber or its Equivalent or Their Compounds; and I do hereby declare the following to be a full and clear description thereof.

The method or process for making articles of the description named, which I am now about to describe, dispenses with the application of heat either to effect the vulcanization or molding of the article. It also, by reason of rubber being used, which has not admixed with it sulfur to effect vulcanization by heat, admits of the employment, in connection with the rubber, of clay, oxids, carbonates, and other earthy substances, and which are calculated to produce finer lines in various molded articles. Thus, it will be seen that said method or process radically differs from the well-known process of making similar articles heretofore practiced and which may be generally described as consisting in the insertion of a closed bag, made of rubber prepared with sulfur having a drop of water inside it, in a suitable mold, and then exposing the whole for a lengthened period to a high temperature, which alike effects the vulcanization of the rubber and by converting the water in the bag into steam causes the bag to assume the shape of the interior of the mold. On the other hand, I take rubber in sheets having no such admixture of sulfur, and cut and properly join the cut portions of said sheets into a bag somewhat of the figure or rough outline of the interior of the molds. Said bag I make with an opening in it, and also form the mold with a hole, for the insertion of a pipe to form a close joint with the interior of the bag. This pipe is connected with an air-pump or any other suitable blower, and, after clamping together the divided mold or molds that contain the bag, I cause air to be forced into the bag, which is accordingly blown out or expanded against the interior of the mold and after remaining so expanded for a short perior of time the bag is caused to retain the shape thus given it by the interior of the mold.

The degree of atmospheric compression within the bag and the length of period for which it is necessary to keep up such compression, varies, the one relatively with or toward the other, and both according to the thickness of the sheets of which the bags are formed, and as other controlling circumstances are changed. Three minutes of time for the compression of air within the bag is in many instances sufficient.

After the article is formed it is removed from the mold and immersed in a hermizing solution or otherwise vulcanized.

The opening formed in the article for the insertion of the pipe used in compressing the air within it may or may not be plugged up on removal from the mold accordingly as said article requires for its utility an opening to be left in it or not.

In addition to the economy in fuel and other advantages referred to at the beginning of this, over or as compared with the process heretofore practiced of making hollow vulcanized rubber goods, may be mentioned the saving of time, and the great saving that is effected by the nonvulcanization of the goods in or as they issue from the molds and whereby if coming out defective the material of which the goods are formed may be worked up again, while a defective cast delivered in a vulcanized condition from the mold is worthless or nearly so.

Of course water under pressure or other fluid might be substituted for air and as a mechanical agent would be the equivalent in effecting the expansion of the bag in the mold.

The drawing accompanying this specification represents two sectional views of a mold with its screw clamps and inflation tube secured to it, and containing an india rubber bulb in a state of completion as manufactured by the process herein above described.

I am aware that the molding of hollow rubber articles has been effected during the process of vulcanization by employing pressure and heat in combination, the only means heretofore known and considered indispensable to render the form of such articles permanent. To this I lay no claim, particularly as the employment of heat constitutes no part of my invention.

Having thus described my invention I shall state my claim as follows:

In the manufacture of hollow and molded rubber articles, the vulcanization, hermizing or treatment of which, for producing the change described, is effected subsequent to their being formed into the desired shape. I claim, forming in a permanent manner the shape of such articles by cementing sheets made of rubber or its equivalent or their compounds to form a bag of a shape approaching that of the intended article, and arranging the same in molds provided with a mouth or opening and forcing therethrough and into the bag air or any other fluid at the ordinary temperature substantially as herein set forth.

In testimony whereof I have signed my name to this specification before two subscribing witnesses.

DUBOIS D. PARMELEE.

Witnesses:
A. POLLAK,
EDW. F. BROWN.